United States Patent
Elliott

[11] Patent Number: 5,926,011
[45] Date of Patent: Jul. 20, 1999

[54] ON-OFF CONTROLLER

[75] Inventor: Charles Richard Elliott, West Yorkshire, United Kingdom

[73] Assignee: Switched Reluctance Drives Limited, Harrogate, United Kingdom

[21] Appl. No.: 09/089,685

[22] Filed: Jun. 3, 1998

[30] Foreign Application Priority Data

Jun. 5, 1997 [GB] United Kingdom .................... 9711630

[51] Int. Cl.$^6$ ...................................................... G05F 1/40
[52] U.S. Cl. ............................................................. 323/266
[58] Field of Search ...................................... 323/266, 270, 323/273, 282, 288, 908; 363/39, 50

[56] References Cited

U.S. PATENT DOCUMENTS

| | | | |
|---|---|---|---|
| 3,764,870 | 10/1973 | Morton et al. | 318/139 |
| 3,771,821 | 11/1973 | Rist et al. | 290/14 |
| 4,581,565 | 4/1986 | Van Pelt et al. | |
| 4,928,054 | 5/1990 | Martin-Lopez | 323/288 |
| 4,959,602 | 9/1990 | Scott et al. | |
| 5,057,765 | 10/1991 | Clark et al. | |
| 5,452,195 | 9/1995 | Lehr et al. | 363/21 |
| 5,525,878 | 6/1996 | Buchanan, Jr. et al. | 318/433 |
| 5,543,739 | 8/1996 | Bontempo et al. | 327/108 |

FOREIGN PATENT DOCUMENTS

| | | |
|---|---|---|
| 0 769 844 A1 | 4/1997 | European Pat. Off. |
| 2 305 313 | 4/1997 | United Kingdom . |

OTHER PUBLICATIONS

Patent Abstracts of Japan, vol. 018, No. 155 (E–1524), Mar. 15, 1994—JP 05 328800 A (Nippondenso Co. Ltd.), Dec. 10, 1993.

*Primary Examiner*—Matthew Nguyen
*Attorney, Agent, or Firm*—Patterson & Keough, P.A.

[57] ABSTRACT

In an on-off current controller for an electrical machine, such as a switched reluctance motor, a delay is created in the switch-off of the current switches after the current reaches the demanded level. The delay causes the current to rise further above the demanded level, but reduces the error between the average current and the demanded level.

25 Claims, 8 Drawing Sheets

ON-OFF CONTROLLER

BACKGROUND OF THE INVENTION

1. Field of Invention

This invention relates to an on-off controller for a parameter, such as current, of an electrical load.

2. Description of Related Art

There are various methods of on-off control of parameters, such as current, in an electrical load. For example, the current output of a switched mode power supply or the torque output of a switched reluctance motor can be controlled by fixed off-time control or hysteresis control. These are examples of on-off or "bang-bang" controllers in which the control regime involves actuation of a switching mechanism between only the two basic states of on and off.

A switched reluctance motor is often controlled by regulating the phase current in the or each phase winding at low speed. This is referred to as current-fed control. As a practical matter, a voltage regulated supply is normally available so an intermediate current controller is used. The controller actuates power switches to apply the voltage across the or each phase winding of the machine to establish and maintain the desired phase current.

A description of switched reluctance machines and their control can be found in the article 'The Characteristics, Design and Applications of Switched Reluctance Motors and Drives' by Stephenson and Blake, presented at the PCIM '93 Conference and Exhibition at Nurnberg, Germany, Jun. 21–24, 1993.

Both the transient and steady-state responses of the controller will be affected by the characteristics of the electrical load that the phase winding represents. For example, the phase circuit of a switched reluctance motor has neither a constant inductance nor a simple 'motional EMF' effect. A simplified mathematical expression for the voltage across a phase circuit of a switched reluctance motor is:

$$v = iR + l(i, \theta)\frac{di}{dt} + i\omega\frac{\partial L}{\partial \theta}(i, \theta) \quad (1)$$

where:

v is the phase voltage
R is the phase resistance
i is the phase current
L is the phase inductance
l is the incremental phase inductance
ω is the rotational speed
θ is the rotor angle relative to the stator
t is time The three different terms in Equation 1 may be explained as follows:

the first term (iR) is that due to the resistive voltage drop in the phase winding;

the second term (l(i,θ)di/dt) is proportional to the rate of change of phase current and is due to the effective inductance of the phase, i.e. the incremental inductance. This term can be seen to be non-linear in nature as the incremental inductance is a function of both current and angle. A plot showing the variation in the incremental inductance of a sample switched reluctance machine is shown in FIG. 1 of the drawings which is a graph of incremental inductance against rotor angle for various values of phase current. This shows that incremental inductance can vary by over 10 to 1 for a machine operated over a wide range of currents, for example a servo-drive;

the last term of Equation 1 (iω∂L(i,θ)/∂θ) can be seen to be proportional to the rotational speed (ω) and is therefore sometimes called the 'motional EMF'. It arises because the phase inductance is a function of rotor angle and therefore varies with time as the machine rotates. It is also non-linear in nature and depends on how the phase inductance varies with rotor angle at a particular phase current and rotor angle. By way of illustration, FIG. 2 shows the motional EMF for a switched reluctance machine for a given speed and various values of phase current.

Many different types of current control schemes are used with switched reluctance machines. For example, fixed off-time current control is often used because it is capable of high bandwidth control and simple implementation. The simplicity is based on the fact that only the switch current need be monitored for feedback, as opposed to the phase winding current. Fixed off-time control functions by switching off the voltage for a prescribed period whenever the current reaches a predetermined demand level. After the off-time interval, the voltage is reapplied by actuating the switches of the converter. While the switches of the converter are non-conducting, knowledge of the phase current is not available, but in many applications this is not a disadvantage.

FIG. 3 shows the basic elements of a conventional off-time controller using a fixed off-time. The current to be monitored is fed to a current transducer 14, which can be of any known type. The output from the current transducer is passed through a noise filter 30 to remove spurious signals which may be present in the current transducer output, due to, for example, the switching action of the converter. In some commercial implementations, current transducers will have an integral noise filter. In either case, the amount of filtering is chosen so that the noise is suppressed without introducing any significant delay into the feedback signal. The output of the noise filter is a signal $i_f$, representative of the current to be controlled. This signal is fed to a comparator 10 which also receives a signal $i_d$ representative of the demanded current. The comparator is arranged to output a signal $i_t$ which changes state when the feedback signal $i_f$ exceeds the demand signal $i_d$.

The output of the comparator $i_t$ is applied both to the reset input of a set-reset flip-flop 22 and to a pulse generator 20 which applies a pulse to the set input of the flip-flop a fixed time, $t_{off}$, after the output of the comparator 10 indicates that the load current has reached the demanded level. The output of the flip-flop is, therefore, a signal which can be used to enable a power converter or other device (not shown) so that it applies current to a load. When the current in the load reaches the demanded current, the output of the comparator changes state.

Where the load is linear, this switching strategy results in a current waveform like that shown in FIG. 4.

The rise and fall of current is depicted as linear and subject to voltages across the winding of the same magnitude but opposite polarity. With these assumptions an expression for the average current can be derived as:

$$i_{av} = i_d - \frac{\Delta i}{2} \quad \text{where} \quad \Delta i = \frac{(V + i_{av}R + \varepsilon)t_{off}}{l} \qquad (2)$$

where:

$i_{av}$ is the average phase current over the switching cycle
$i_d$ is the demanded phase current
$\Delta i$ is the current excursion during the off time
V is the DC link voltage
R is the phase resistance
$\varepsilon$ is the 'motional EMF'
l is the incremental inductance The rise and fall of the current is, of course, not generally linear in practice. However, provided that the switching period is short compared with the time constant of the phase circuit, the error due to this approximation is often acceptably small.

It should be noted that, in this context, there may be a difference between the average current calculated over many switching cycles and the average current calculated over a few switching cycles. This can arise because of the nonlinearities referred to earlier or because of the demanded current changing over the phase cycle of the machine. In the description which follows, the term "average current" refers to the average over a few switching cycles.

From Equation 2 it can be deduced that the difference between the average phase current and the demanded current will vary according to the particular circuit characteristics. In many cases, the discrepancy is acceptable. When the phase current excursion from the demanded level is small, and/or an outer control loop governs the final motor output, the discrepancy can be compensated for. However, in other situations the discrepancy cannot be tolerated, for example, in applications where the phase current is required to be accurately profiled over a complete conduction cycle.

In fixed off-time current control of a non-linear electrical load, such as a phase of a switched reluctance motor, a variable error occurs in the average current. While this may be acceptable in some applications, higher performance applications will involve increasingly rapid changes in current that cannot be addressed adequately by an outer control loop because it is likely to introduce an output ripple in attempting to eradicate the error in the average current.

The same is generally true of other forms of control, such as hysteresis current control.

SUMMARY OF THE INVENTION

It is an object of the invention to reduce the error between the demanded parameter and the average parameter in a load controlled by on-off control.

According to an embodiment of the invention there is provided a method of on-off current control for a load, the method comprising: setting a demanded current value; applying a voltage across the load by actuating switch means to initiate a rising current through the load; and removing the voltage from the load only after a delay has elapsed following the current reaching the demanded current value, such that the current exceeds the demanded value, the value of the error between the average current and the demanded value being reduced as a result.

In one form of the invention the delay is fixed at a predetermined period. Alternatively, the duration of the delay is derived from a period for which the voltage was previously applied across the load. In this case the delay may be equal to the said period for which the voltage was previously applied across the load.

In a particular form, the method may include comparing a demand signal indicative of the demanded current with a feedback signal indicative of a load current to produce an output signal having two states; producing a switch means deactuation signal in response to the output changing state; and delaying deactuation of the switch means by the deactuation signal for the period of the delay.

In another form, the method may include generating a feedback signal indicative of a current in the load; low-pass filtering the feedback signal; and comparing a demand signal indicative of the demanded current value with the feedback signal to produce a switch means deactuation signal in response to the feedback signal, thereby delaying actuation of the switch means by the deactuation signal.

In a further alternative form, the method may include determining the actuation period for which the switch means is actuated; and setting the deactuation period for which the switch means is subsequently deactuated in response to the actuation period. In this form the deactuation period is substantially equal to the actuation period. The actuation period may be determined by initiating one count in one direction from one value at the start of the actuation period and the deactuation period is set by initiating another count in the other direction from the value at the end of the one count to the one value. The method may also include setting a maximum actuation period; comparing the determined actuation period with the maximum actuation period; and reducing the deactuation period if the determined actuation period exceeds the maximum actuation period. In this case the deactuation period may be reduced to a predetermined value.

The invention also extends to an on-off controller for a parameter of an electrical load, the controller comprising: switch means actuatable to control the supply of electrical power to the load; demand means for producing a parameter demand signal; means for producing a parameter signal that is indicative of the parameter of the load; means for deriving an error signal from the demand signal and the parameter signal; control means arranged to receive the error signal and to produce one actuation signal for the switch means of a duration to reduce the error when the error signal exceeds a predetermined value and to produce another actuation signal for the switch means otherwise; and delay means operable to delay the one actuation signal when the error signal exceeds the said demand value, the value of an error between the average parameter value and the value indicated by the parameter demand signal being reduced as a result.

According to an embodiment of the invention a delay can be introduced in the controller such that the system compensates for the errors which are inherently present in an on-off controller. This goes against conventional wisdom that control systems generally work better by eliminating delays in the processing.

BRIEF DESCRIPTION OF THE DRAWINGS

The invention can be put into practice in various ways some of which will now be described by way of example with reference to the accompanying drawings, in which.

DETAILED DESCRIPTION OF PREFERRED EMBODIMENTS

While in general terms a control system is generally considered to be improved by reducing or eliminating time delays in feedback loops, this invention recognizes that, by inserting a time delay within the feedback loop, the error between the demanded and the actual average current which normally occurs in a fixed off-time controller can be greatly reduced and, in some instances, virtually eliminated. By inspection of FIG. 6 and of Equation 2 above, it will be seen that the time delay required to eliminate the steady state error is:

$$t_{delay} = \frac{(V + iR + \varepsilon)}{(V - ir - \varepsilon)} \cdot \frac{t_{off}}{2} \quad (3)$$

The time delay can be of fixed duration, but there will be further advantage if it is of variable duration, preferably such that the duration is linked to the rate of rise of current.

Figure 1:
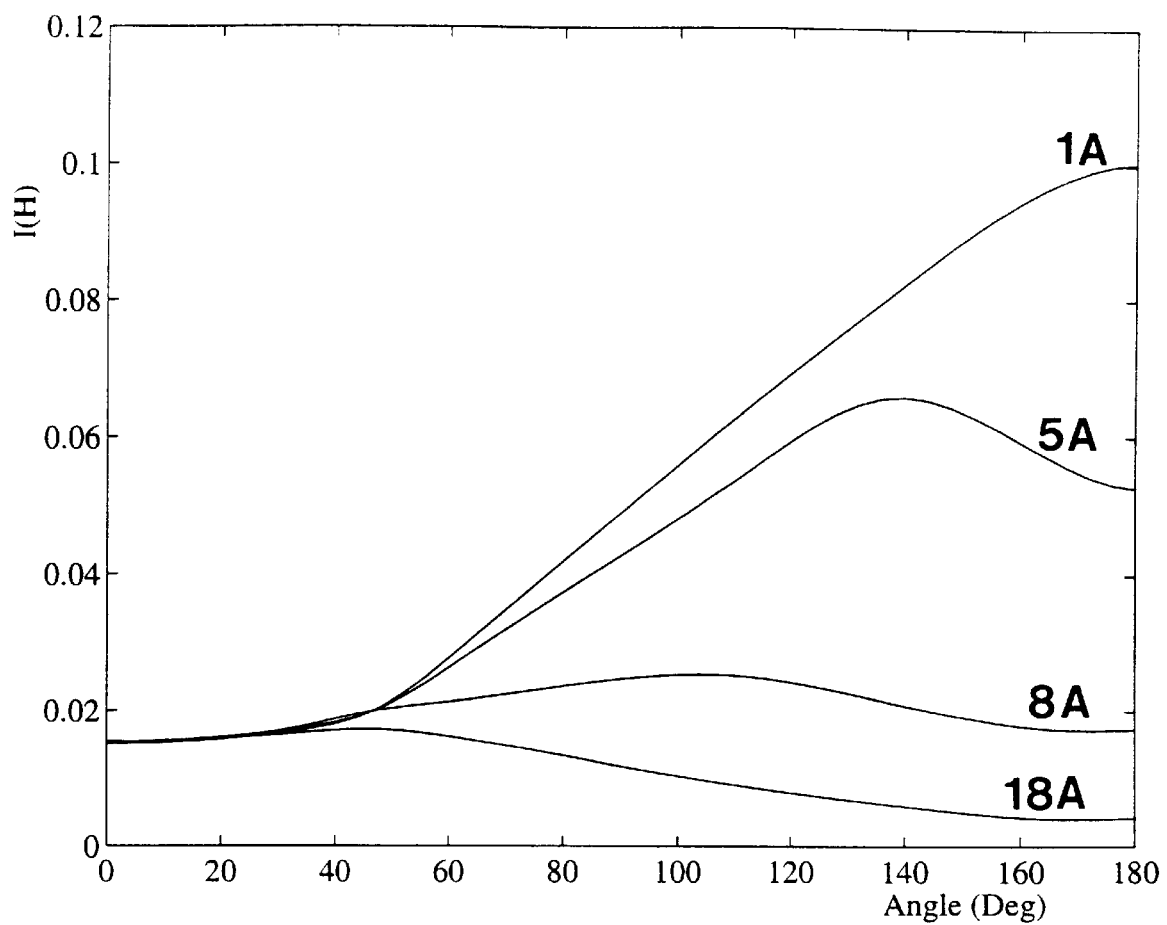
FIG. 1 is a graph of incremental inductance against electrical angle of a switched reluctance machine over half a cycle of the inductance period for various phase current values.
Figure 2:
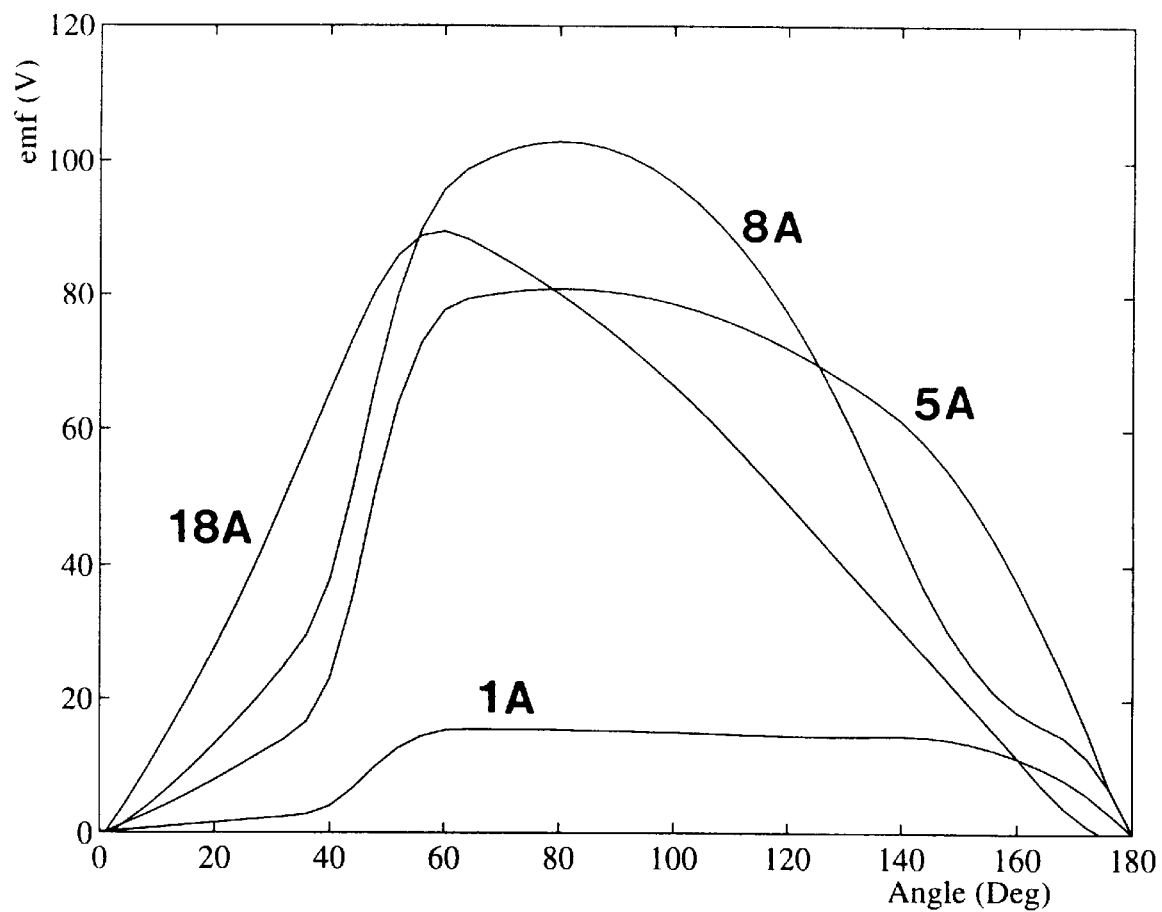
FIG. 2 is a graph of motional emf against electrical angle of a switched reluctance machine over half a cycle of the inductance period for various phase current values.
Figure 3:
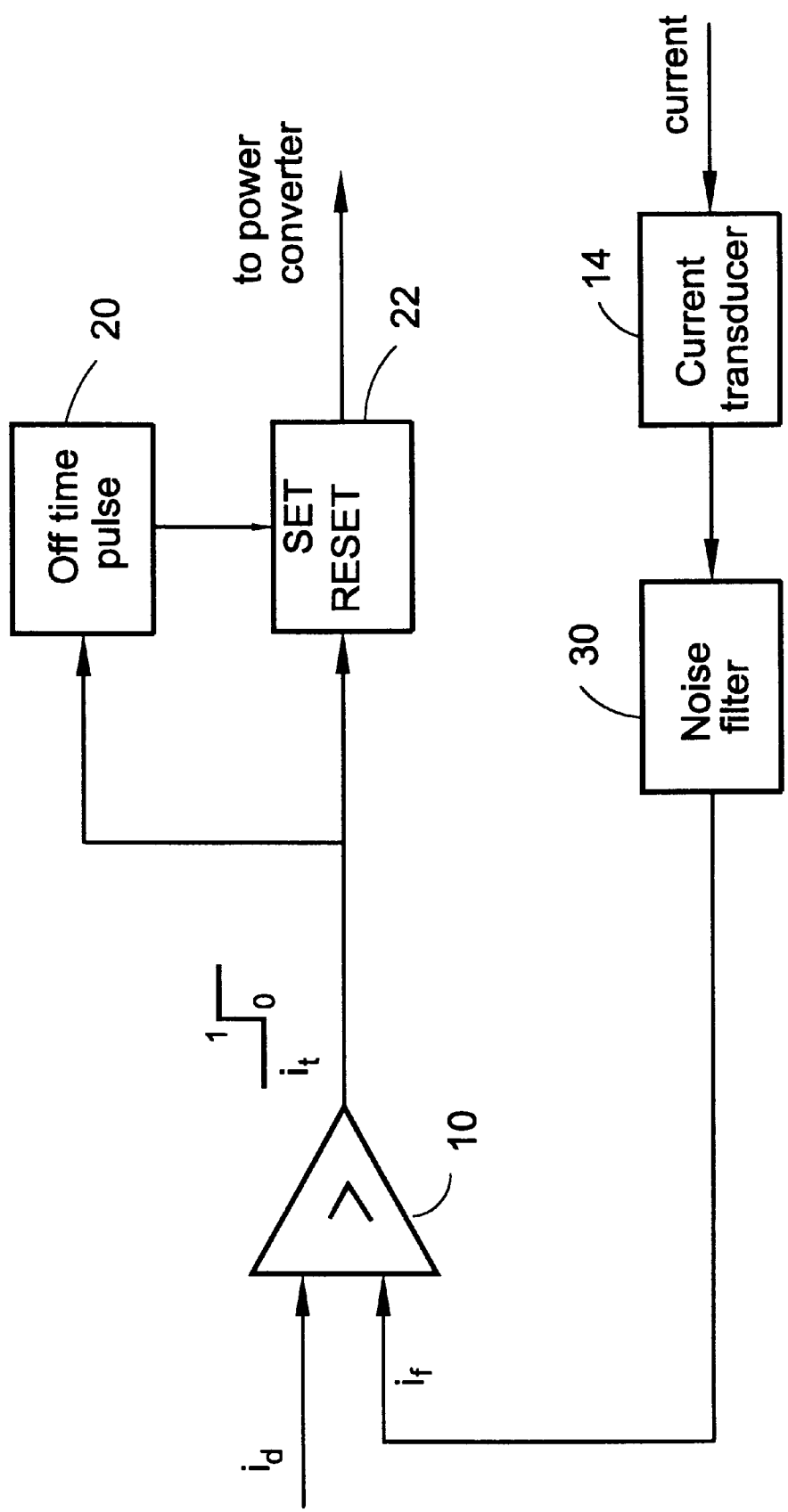
FIG. 3 is a schematic block diagram of a conventional, fixed off-time controller.
Figure 4:
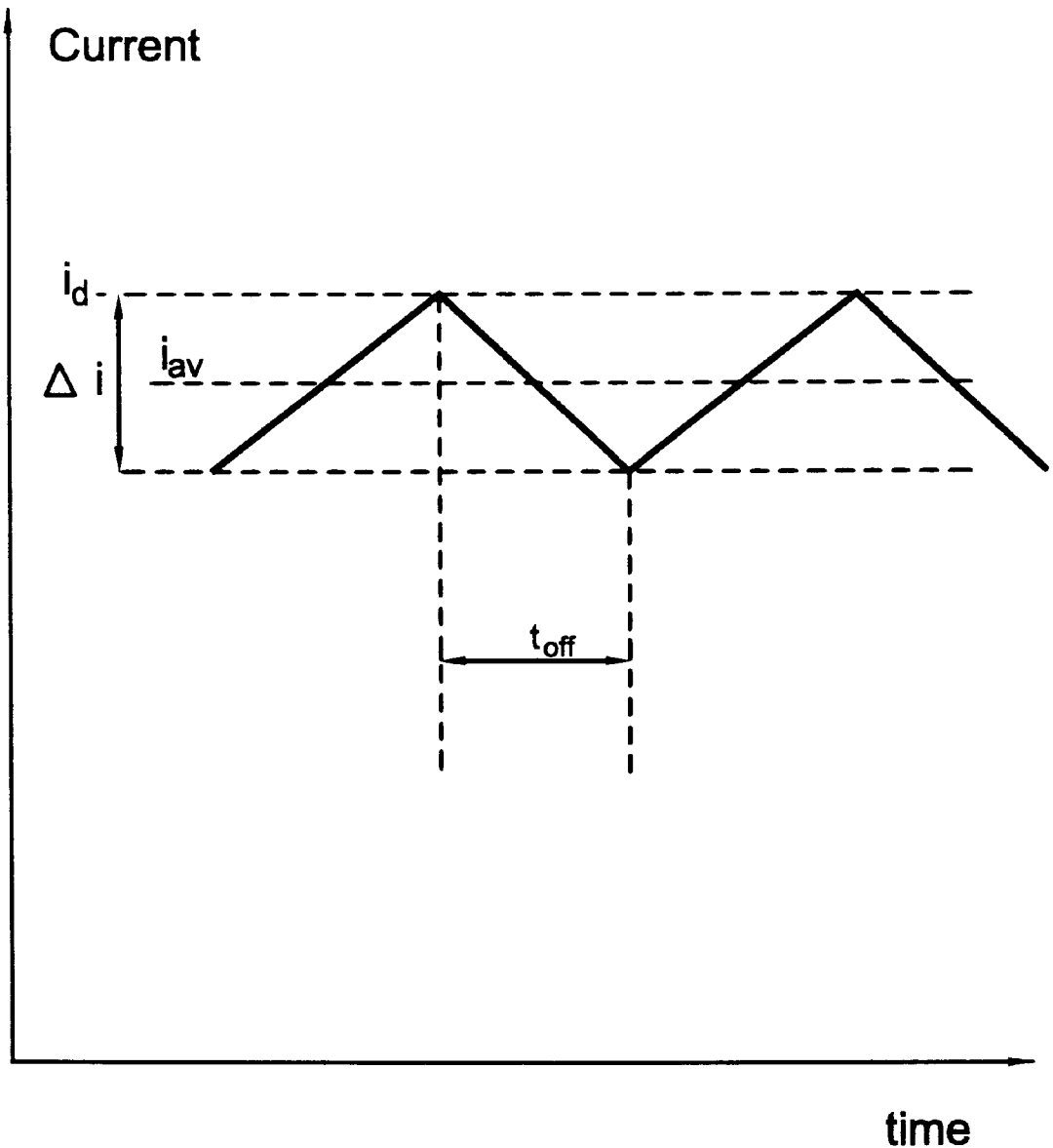
FIG. 4 is a graphical illustration of phase current switching for a conventional, fixed off-time controller.
Figure 5:
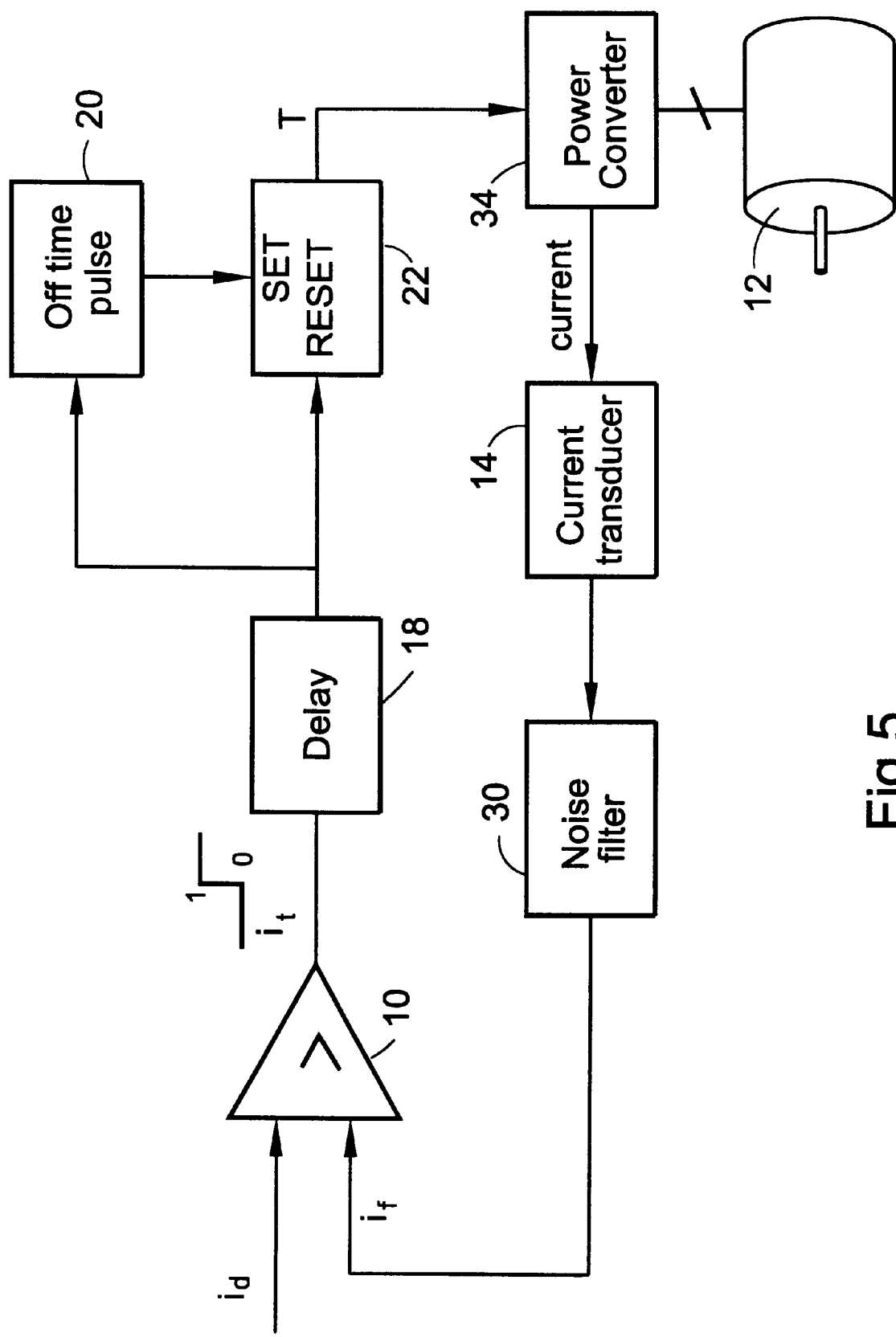
FIG. 5 is a schematic block diagram of a first embodiment of an off-time controller according to the invention using fixed delay.

FIG. 5 shows a schematic block diagram of a first embodiment of the invention, where a fixed delay is introduced into the feedback loop of an off-time controller. As stated above, the off-time controller is a form of on-off controller which is capable of only an on state and an off state as opposed, for example, to a controller which is able to produce a control signal value that is a function of the error between a demand signal and an actual value of the parameter.

The controller comprises a comparator 10 that receives an input signal $i_d$ indicative of a current demand and a feedback signal $i_f$ indicative of the phase current in the phase winding of a switched reluctance machine 12. The signal $i_f$ is supplied by a sensor in the form of a current transducer 14, through a suitable noise filter 30. The output of the comparator is a switch actuation signal $i_t$ that is applied to a turn-off delay circuit 18. The output of the delay circuit 18 is applied to an off-time pulse generator 20 that provides a pulse after the fixed off-time appropriate to the application has expired. The output of the delay is also applied directly to the reset input of a set-reset flip-flop 22 which produces a switch firing pulse T which is supplied to a power converter 34. The power converter functions to activate selectively the power switches of each phase circuit of the motor 12, according to known art, so that current is controlled in the phase winding.

If $i_f$ is less than $i_d$, the comparator will output a switch turn-on signal $i_t$ that is unaffected by the presence of the delay circuit 18. The signal $i_t$ enables the firing signal T in a phase conduction period. Eventually, the signal $i_f$ will reach the value of the demanded current, $i_d$. At this point, the output of the comparator will change to a switch turn-off signal. However, the turn-off signal will only be relayed by the delay circuit 18 after the delay period has elapsed. After the delay, the turn-off signal is applied to the flip-flop 22, resetting it and causing the switches in the power converter to be opened. The current then begins to fall. After the predetermined off-time has expired (determined by the off-time pulse generator 20) the flip-flop is set and the switches in the power convertor are closed. It will therefore be seen that the current in the phase winding will fall for the predetermined duration and, at the end of the off-time, assuming the phase current has fallen below the demanded level, the power switches will again be turned on to reapply the voltage until the demanded current is again reached.

Figure 6:
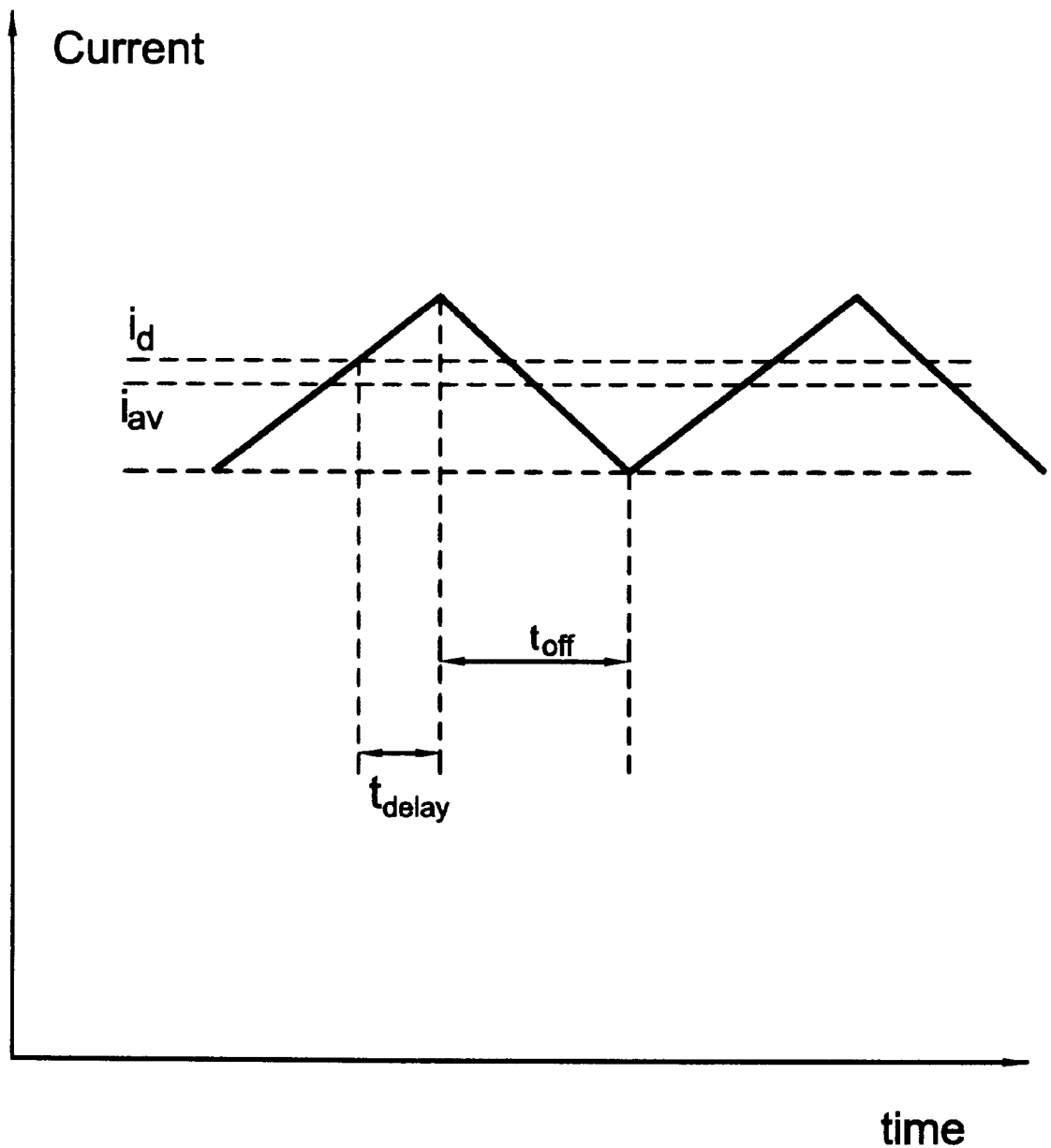
FIG. 6 is a graphical illustration of phase current switching for the off-time controller of FIG. 5.

FIG. 6 illustrates the phase current $I_{ph}$ rising to the demanded level $i_d$ and continuing to rise as the de-actuation of the switches is delayed for the delay period $t_{delay}$. After the delay, the switches are de-actuated to initiate a falling current for a predetermined off-time $t_{off}$. At the end of the off-time, the switches are again actuated to cause the current to rise and the switching cycle repeats.

In this embodiment of the invention, a constant off-time delay is introduced into the current control loop. The delay circuit could be either an analog or a digital arrangement triggered by the phase current reaching the demand. A typical value for $t_{delay}$ is half the off-time. The delay could also be effected as a common part of the circuit of the off-time pulse generator 20, depending on the value of time delay required and the implementation chosen.

Figure 7:
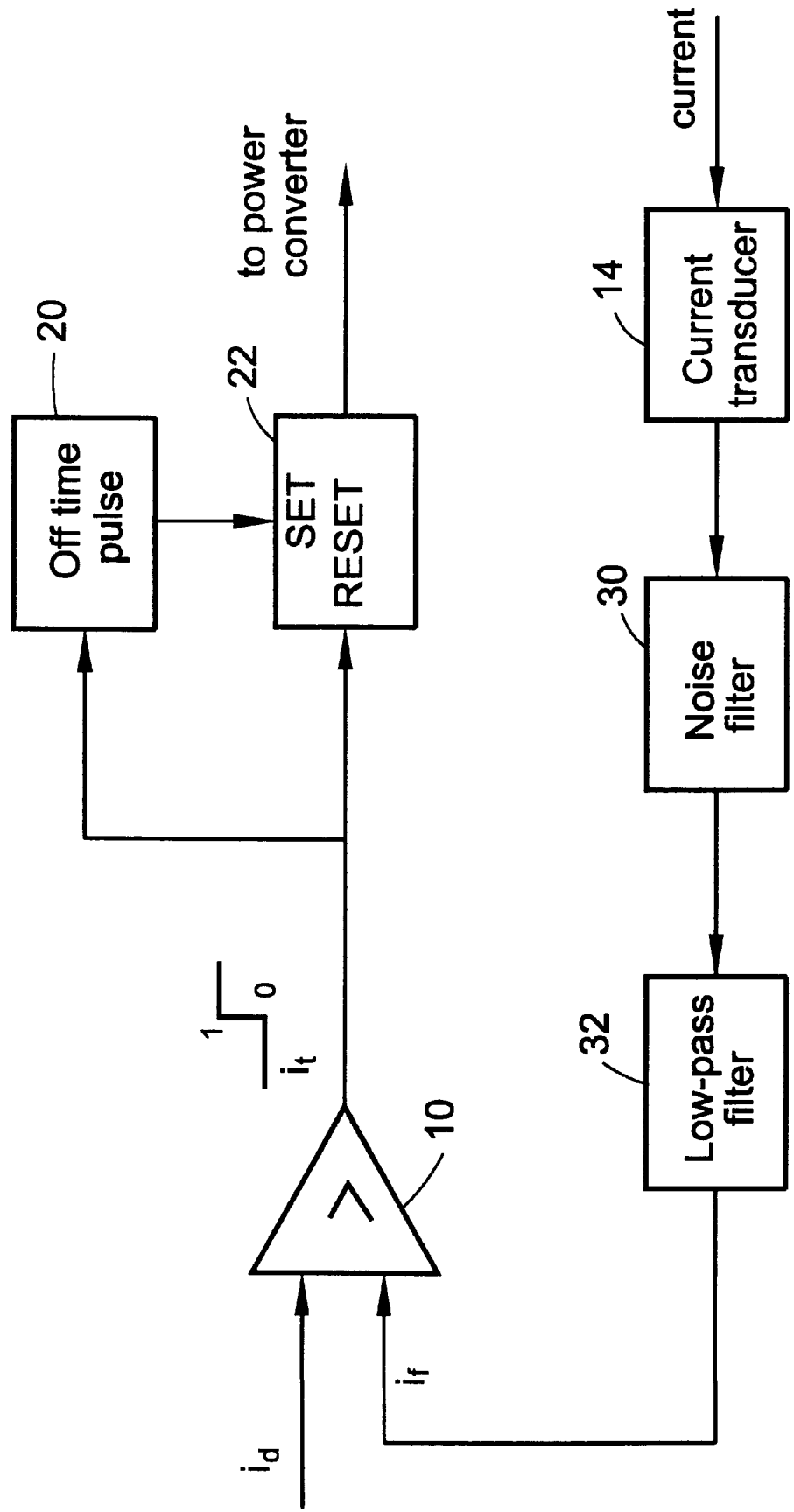
FIG. 7 is a schematic block diagram of a second embodiment of an off-time controller according to the invention, using variable delay.

FIG. 7 illustrates a second embodiment of the invention in which some parts have the same reference numerals as their equivalents in FIG. 5.

A low pass filter 32 is connected between the output of the noise filter 30 and the input to the comparator 10. This creates a delay sufficient to cause the actual current to overshoot the demanded current and hence reduce the average error. This is due to the lag which the additional filtering introduces between the current feedback signal and the actual phase current. The amount of the lag will vary according to the characteristic of the additional filtering and the slope of the phase current. Care must be taken to ensure that the additional filtering does not cause instability or other incorrect operation of the current control. In some circumstances the additional filtering may be combined with conventional filtering used to reduce electrical noise which allows correct operation of the current control. This technique could therefore be implemented by reducing the cutoff frequency of existing filtering used to remove noise. The turn-off delay introduced would only be an approximation to that required to eliminate the error, but with the correct choice of filter this technique can significantly reduce the error over a large part of the operating range. Typical values for the low-pass filter would be R=1kΩC=1nF for an off-time of 40 μsec. In effect, this embodiment provides a variable turn-off delay dependent on the rate of rise of the feedback signal.

Figure 8:
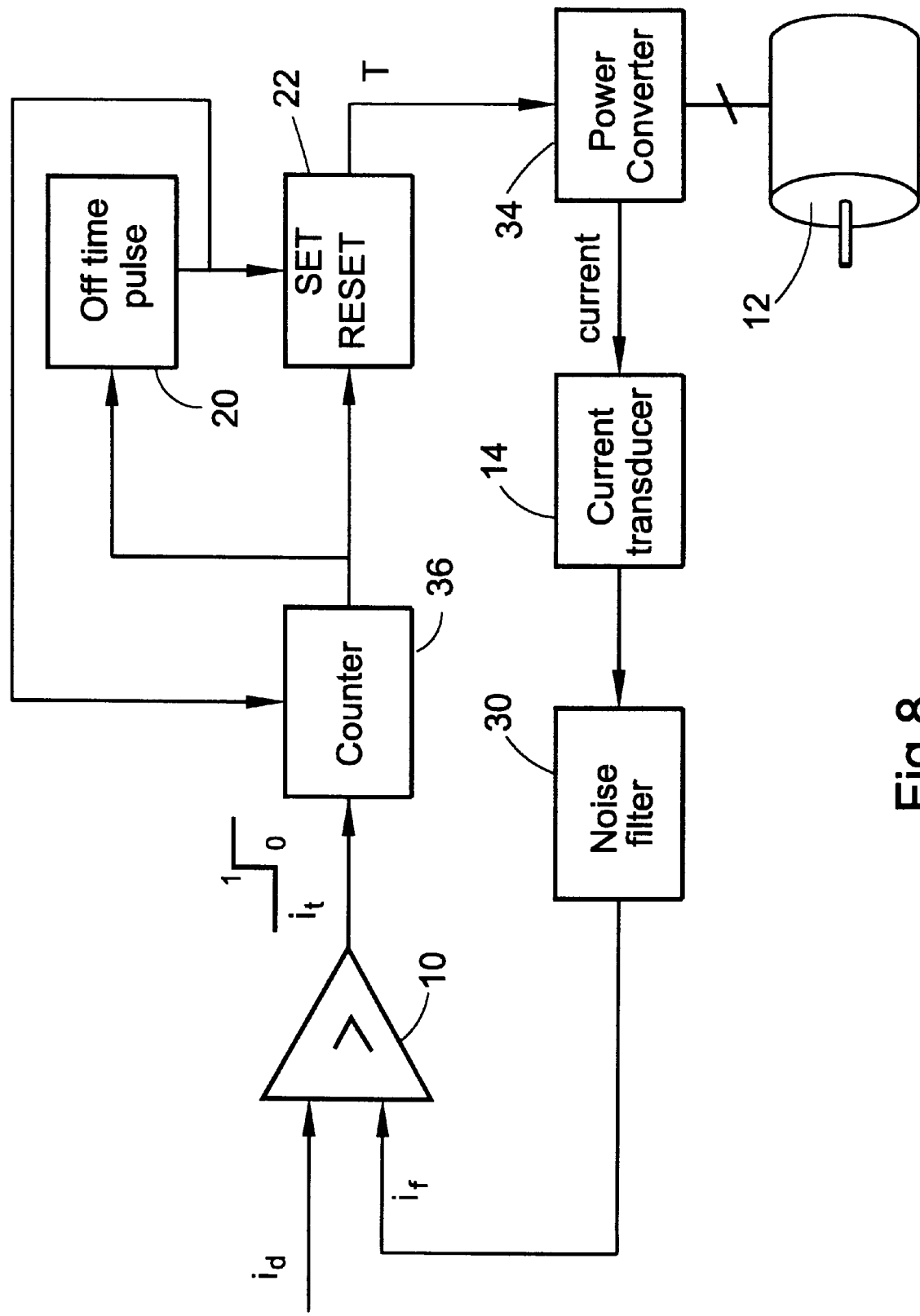
FIG. 8 is a schematic block diagram of a third embodiment of an off-time controller according to the invention, using variable delay.

In a third embodiment, shown in FIG. 8, the off-time is variable and is chosen according to the rate of rise of current. The circuit is arranged to include an up/down counter 36, which has an integral zero-count detector, receiving the output $i_t$ of the comparator 10. The output of the counter is applied to the pulse generator 20 and the flip-flop 22. The remaining circuit components are arranged as in the previous embodiments and have the corresponding reference numerals.

After the off-time of a previous cycle is concluded, the switch signal T is produced by the flip-flop 22 in the previously described manner, the voltage is applied to the load and the up/down counter is reset. The counter then begins to count up. When the comparator detects that the demanded current has been reached and changes its output state, the output is applied to the counter 36 to cause the count to go in the reverse direction. The length of the count is the effective delay before the output of the flip-flop 22 is changed. At the end of the reverse count the zero-count detector causes the output of the counter to go high.

In this way, and provided the phase current parameter variations take place slowly compared with a switching period, the phase current waveform is automatically symmetrical about the demanded current. The steady state error will be substantially eliminated. Time delays in the control loop to do with sensing the current, detecting that the demanded current level has been reached and delays in controlling the switches will cause a small steady-state error in practice, but these can be factored out in the overall control system using known techniques.

This period measurement and adjustment works in a desirable manner provided the demanded current signal does not change so rapidly that the phase current becomes slew limited by the finite forcing voltage available. Under these circumstances either the on-time or the off-time become much longer than a usual switching period in order to change the value of the average current to a new demanded current level. This embodiment of the invention also works correctly provided the transition of the demanded current level is in a negative direction. In this case the on-time is very small as, after the off-time is over, the switches are fired and almost instantly turned back off again as there is too much current in the phase. However, when the transition is in the positive direction, the on-time becomes long. When this embodiment of the invention is used, a longer turn-off delay is produced which could cause the current substantially to overshoot the required current level. This condition will happen in practice at the start of every phase period, and additional control action is preferable to address this. Therefore, the system shown in FIG. 8 limits the maximum turn-off delay whenever the on-time exceeds a given amount (e.g. a complete switching period).

This is implemented in FIG. 8 by limiting the maximum count of the counter and can be achieved by any one of a number of known methods. Under very rapid dynamic conditions a good response from the controller is possible, while under steady-state or slowly varying conditions the error between the demanded current and the actual phase current is substantially removed.

While the descriptions of the above implementations have been based on a power converter which uses only two states for the switch arrangement, those skilled in the art will recognize that it is equally possible to use the invention with a power converter which incorporates a 'freewheel' state in its switching sequence. While the actual parameter values for such an arrangement might differ from those described above, the same basic method applies.

It will also be evident that a digital implementation of the above embodiments of the invention could be made in a microprocessor or similar digital device as part of a larger overall control scheme. Such implementations are well-known to those skilled in the art.

While the invention has been described in connection with the illustrated embodiments discussed above, those skilled in the art will recognize that many variations may be made without departing from the present invention. It will be appreciated that the circuits can be implemented in digital, analog or a combination of digital and analog arrangements. Accordingly, the above description of embodiments is made by way of example and not for the purposes of limitation. The present invention is intended to be limited only by the spirit and scope of the following claims.

What is claimed:

1. A method of on-off current control for an electrical load, the method comprising:

setting a demanded current value;

applying a voltage across the load by actuating switch means to initiate a changing current through the load, the changing current having an average current value;

initiating a delay after the current through the load has reached the demanded current value; and removing the voltage from the load after the delay such that the current exceeds the demanded value, the value of the error between the average current value and the demanded value being reduced as a result.

2. A method as claimed in claim 1 in which the delay is fixed at a predetermined period.

3. A method as claimed in claim 1 in which the duration of the delay is derived from a period for which the voltage is previously applied across the load.

4. A method as claimed in claim 1 in which the duration of the delay is derived from the rate of change of current through the load.

5. A method as claimed in claim 1, including:

comparing a demand signal indicative of the demanded current with a feedback signal indicative of a load current to produce an output signal having two states;

producing a switch means deactuation signal in response to the output changing state; and delaying actuation of the switch means by the deactuation signal for the period of the delay.

6. A method as claimed in claim 1, including:

generating a feedback signal indicative of a current in the load; low-pass filtering the feedback signal; and comparing a demand signal indicative of the demanded current value with the feedback signal to produce a switch means deactuation signal in response to the feedback signal, thereby delaying actuation of the switch means by the deactuation signal.

7. A method as claimed in claim 1, including:

determining the actuation period for which the switch means is actuated; and setting the deactuation period for which the switch means is subsequently deactuated in response to the actuation period.

8. A method as claimed in claim 7 in which the deactuation period is substantially equal to the actuation period.

9. A method as claimed in claim 7 in which the actuation period is determined by initiating one count in one direction from one value at the start of the actuation period and the deactuation period is set by initiating another count in the other direction from the value at the end of the one count to the one value.

10. A method as claimed in claim 7, including:

setting a desired actuation period;

comparing the determined actuation period with the desired actuation period; and reducing the deactuation period if the determined actuation period exceeds the desired actuation period.

11. A method as claimed in claim 10, including reducing the deactuation period to a predetermined value.

12. A method as claimed in claim 1 in which the voltage is removed from the load after the said delay and for a predetermined off-time.

13. An on-off controller for a parameter of an electrical load, the parameter having an instantaneous and an average value, the controller comprising:

switch means for controlling the supply of electrical power to the load;

demand means for producing a parameter demand signal;

means for producing a parameter signal that is indicative of the instantaneous value of the parameter of the load;

means for deriving an error signal from the demand signal and the parameter signal;

control means for receiving the error signal and producing one actuation signal for the switch means of a duration to reduce the error when the error signal exceeds a predetermined value and to produce another actuation signal for the switch means otherwise; and delay means for delaying the one actuation signal when the error signal exceeds the said predetermined value, the value of an error between the average parameter value and the value indicated by the parameter demand signal being reduced as a result of the delay.

14. A controller as claimed in claim 13 in which the control means includes a threshold detector, the said predetermined value being a threshold set in the threshold detector.

15. A controller as claimed in claim 14 in which the threshold detector includes means for producing the one actuation signal having a fixed duration when the error signal exceeds a predetermined magnitude.

16. A controller as claimed in claim 14 in which the delay means is arranged to receive the output of the threshold detector to delay the one actuation signal.

17. A controller as claimed in claim 13, including a comparator arranged to receive the demand signal and the parameter signal to produce the error signal which is indicative of the difference between the demand and the parameter signals.

18. A controller as claimed in claim 13 in which the delay means includes a low-pass filter arranged to receive the parameter signal to cause it to lag the demand signal.

19. A controller as claimed in claim 13 in which the delay means is responsive to the duration of the other actuation signal to determine the period of the delay of the one actuation signal.

20. A controller as claimed in claim 19 in which the delay means is operable to set the duration of the one actuation signal substantially equal to the duration of the other actuation signal.

21. A controller as claimed in claim 19 in which the delay means includes a counter operable to count in one direction from a start value over the duration of the other actuation signal to an end value and to count in the other direction from the end value at the end of the other actuation period to the start value to determine the one actuation period.

22. A controller as claimed in claim 13 in which the delay means is operable to delay the one actuation signal for a predetermined period.

23. An on-off controller for a parameter of an electrical load, the parameter having an instantaneous and an average value, the controller comprising:

a switching mechanism for controlling supply of electrical power to the load;

a parameter signal production device for producing a parameter signal indicative of the instantaneous value of the parameter of the load;

an error signal derivation device for deriving an error signal from the parameter signal and a demand signal;

a controller for receiving the error signal and producing one actuation signal for the switching mechanism of a duration to reduce the error when the error signal exceeds a predetermined value and to produce another actuation signal for the switching mechanism otherwise; and a delay device for delaying the one actuation signal when the error signal exceeds the said predetermined value, the value of an error between the average parameter value and the value indicated by the parameter demand signal being reduced as a result of the delay.

24. A method as claimed in claim 1 in which actuation of the switch means is delayed for the period of the delay.

25. A method of on-off current control for an electrical load, the method comprising:

setting a demanded current value;

applying a voltage across the load by actuating switch means to initiate a changing current through the load;

comparing a demand signal indicative of the demanded current with a feedback signal indicative of load current to produce an output signal having two states;

producing a switch means deactuation signal in response to the output signal changing state; and removing the voltage from the load after a delay following the current reaching the demanded current value, such that the current exceeds the demanded value, the value of the error between the average current and the demanded value being reduced as a result, actuation of the switch means by the deactuation signal being delayed for the period of the delay.

* * * * *